(12) United States Patent
Golan

(10) Patent No.: US 11,605,054 B2
(45) Date of Patent: Mar. 14, 2023

(54) SYSTEM AND METHOD FOR RECOGNIZING ENVIRONMENT AND/OR LOCATION USING OBJECT IDENTIFICATION TECHNIQUES

(71) Applicant: GO BEEN THERE LTD., Omer (IL)

(72) Inventor: Yosef Golan, Gedera (IL)

(73) Assignee: GO BEEN THERE LTD., Omer (IL)

( * ) Notice: Subject to any disclaimer, the term of this patent is extended or adjusted under 35 U.S.C. 154(b) by 0 days.

(21) Appl. No.: 16/307,084

(22) PCT Filed: Jun. 5, 2017

(86) PCT No.: PCT/IL2017/050627
§ 371 (c)(1),
(2) Date: Dec. 4, 2018

(87) PCT Pub. No.: WO2017/212483
PCT Pub. Date: Dec. 14, 2017

(65) Prior Publication Data
US 2020/0311164 A1  Oct. 1, 2020

(30) Foreign Application Priority Data

Jun. 6, 2016 (GB) ..................... 1609833

(51) Int. Cl.
*G06F 16/9537* (2019.01)
*G06Q 50/14* (2012.01)
(Continued)

(52) U.S. Cl.
CPC ........... *G06Q 10/10* (2013.01); *G06F 16/738* (2019.01); *G06F 16/787* (2019.01);
(Continued)

(58) Field of Classification Search
CPC ......... G06K 9/00711; G06K 9/00758; G06K 9/00624; G06K 9/00664; G06K 9/00744;
(Continued)

(56) References Cited

U.S. PATENT DOCUMENTS 8,792,676 B1 * 7/2014 Jing ..................... G01S 5/16
701/438
8,942,535 B1 * 1/2015 Galligan .............. H04N 9/8205
386/210

(Continued)

OTHER PUBLICATIONS

Friedland, G., Vinyals, O., & Darrell, T. (Oct. 2010). Multimodal location estimation. In Proceedings of the 18th ACM international conference on Multimedia (pp. 1245-1252). (Year: 2010).*

(Continued)

*Primary Examiner* — Tamara T Kyle
*Assistant Examiner* — Lana Alagic
(74) *Attorney, Agent, or Firm* — Roach Brown McCarthy & Gruber, P.C.; Kevin D. McCarthy

(57) ABSTRACT

The system and method of the present invention identify an environment or a location out of a sequence of information received in a video format. The invention provides a learning system and therefore the more videos that are received, relating to a specific environment/location, the more accurate the identification will be when a different image is later analyzed, including the ability to identify the environment/location seen from different viewpoint and angles.

10 Claims, 6 Drawing Sheets

(51) Int. Cl.
*G06V 20/10* (2022.01)
*G06V 20/40* (2022.01)
*G06F 16/738* (2019.01)
*G06F 16/787* (2019.01)
*G06Q 10/10* (2023.01)
*G06V 20/00* (2022.01)

(52) U.S. Cl.
CPC ......... *G06F 16/9537* (2019.01); *G06Q 50/14* (2013.01); *G06V 20/00* (2022.01); *G06V 20/10* (2022.01); *G06V 20/46* (2022.01); *G06V 20/48* (2022.01)

(58) Field of Classification Search
CPC ..... G06K 9/00; G06F 16/9537; G06F 16/783; G06F 7/00; G06F 16/00; G06F 16/738; G06F 16/787; G06F 16/78; G06F 16/7867; G06F 18/00; G06Q 50/14; G06Q 10/10; G06Q 10/025; G06V 20/10; G06V 20/46; G06V 20/48; G06V 20/00; G06V 20/176; G06V 20/182; G06V 20/188; G06V 20/194; G06V 20/05; G06V 20/50; G06V 20/60; G06V 20/66; G06V 20/69; G06V 20/693; G06V 20/695; G06V 20/698; G06V 20/70
See application file for complete search history.

(56) References Cited

U.S. PATENT DOCUMENTS

| | | | |
|---|---|---|---|
| 9,818,451 B1* | 11/2017 | Tyagi | G06V 20/49 |
| 2009/0123025 A1* | 5/2009 | Deng | G06K 9/3266 |
| | | | 382/100 |
| 2011/0167357 A1* | 7/2011 | Benjamin | H04M 1/72457 |
| | | | 715/753 |
| 2012/0310968 A1* | 12/2012 | Tseng | G06F 16/5866 |
| | | | 707/769 |
| 2014/0310319 A1* | 10/2014 | Zhao | G06F 16/583 |
| | | | 707/803 |
| 2015/0130799 A1* | 5/2015 | Holzer | H04N 13/279 |
| | | | 345/420 |
| 2017/0060867 A1* | 3/2017 | Moutinho | H04N 21/84 |

OTHER PUBLICATIONS

International Search Report for PCT/IL2017/050627, dated Jul. 30, 2017; 3 pages.
Written Opinion of the International Searching Authority for PCT/IL2017/050627, dated Jul. 30, 2017; 7 pages.
Gerald Friedland et al.; "Multimodal Location Estimation", Proceedings of the 18th ACM International Conference on Multimedia, ACM 2010, Oct. 25-29, 2010, 7 pages.

* cited by examiner

Select Video

DB videos | Youtube | File

☑ Show un approved videos  ☑ Show YouTube videos
☐ Show approved videos     ☑ Show file videos

| Title | Video ID | Is Approved | Last Update Time |
|---|---|---|---|
| My Top 10 places to eat in Sydney for $2X | 6d346ea8-a8f2-42c3-b3dc-9bb3c3f | False | 5/28/2017 9:53:17 PM |
| Top 5 Romantic Attractions in Sydney, Au | 2f3fa219-ebdc-48e8-8f1e-cee2026t | False | 5/28/2017 8:35:04 PM |
| Top 5 Must-See Attractions in Sydney, Au | 00c68958-8e31-4a7c-b4de-0b360e | False | 5/28/2017 6:37:40 PM |
| Bolzano: A Beautiful Mix of Germany and | d6af700d-426d-4c14-987e-dc324bt | False | 5/28/2017 6:06:16 PM |
| 17 things not to miss in Croatia | 9b5a7ff4-2d71-4fa6-b3ab-dc8e04rz | False | 5/28/2017 8:12:03 AM |
| 25 Things to do in Warsaw, Poland \| Top / | 07e85072-7a44-40a1-96b4-9210c9fc | False | 5/27/2017 3:04:36 PM |
| 25 Things to do in Toronto Travel Guide | 42676e0a-ad27-4129-9b88-a58146 | False | 5/27/2017 2:30:46 PM |
| Top 10 things to do in Toronto - toronto\* | ede64c26-bbb1-4b44-a7db-2e5591 | False | 5/26/2017 11:48:34 AM |
| 15 Hidden Secrets & Best Places in Shang | 39114816d-5fce-4317-9384-9d3c4816 | False | 5/21/2017 1:33:11 PM |
| Tirana, Albania - Travel Around The Work | 7a200aca-b275-4b51-8858-9f14e44c | False | 5/20/2017 1:43:42 PM |
| Top Things To See In Tirana, Albania [Dron | a8a7bb42-bcd3-4761-997a-60608c | False | 5/20/2017 1:37:58 PM |

[Select]

Fig. 3B

Select Site

City: Toronto

| Name | Is Approved |
|---|---|
| Rogers Centre | True |
| College Street | True |
| Princess of Wales Theatre | True |
| CF Toronto Eaton Centre | True |
| Fran's Restaurant | True |
| CN Tower | True |
| Nathan Phillips Square | True |
| Chinatown | True |
| Royal Ontario Museum | True |

☐ Show un approved sites
☑ Show approved sites

[Select] [Cancel] [Add Site]

SYSTEM AND METHOD FOR RECOGNIZING ENVIRONMENT AND/OR LOCATION USING OBJECT IDENTIFICATION TECHNIQUES

FIELD OF THE INVENTION

The present invention relates to the field of image recognition and identification. More specifically, the invention relates to a method and system for recognizing an environment or location using object identification techniques.

BACKGROUND OF THE INVENTION

Object detection and recognition is usually a simple task for humans and take no more than a few seconds. People recognize object according to specific features. However, for a computer a color image is no more than a three-dimensional array of numbers and the values of the numbers have nothing to do with the content of the image. Picture size depends on the pixels in their height and width, which may be equal for a square-shaped image, or not equal for a rectangular-shaped one. For example, for a picture with 64 pixel high and 64 pixel width each pixel is defined by one of three integers for red, green or blue (RGB channels) so that picture is represented as an array of (64×64×3)=12288 independent integers. At the pixel level, two pictures that show the same place from different points of view are completely different, although as said, they are showing the same place. A computer cannot recognize the content of an image. Therefore, a machine learning technique, which tries to classify and distinguish images by using 12288 raw pixel values as independent features, cannot work. Thus, the identification of a location/environment using a simple image search brings to poor results.

In the context of this description the terms "location", "site" and "environment" are used interchangeably, since the intention is to identify the place to which the picture relates. Thus, for instance, a garden with trees and a bench viewed from behind may be termed the "environment" of a building, while an image only showing the bench, taken from the front and looking quite differently than from behind, may point to the "location" of that bench (in the same environment).

It is an object of the invention to provide a system and method for recognizing environments/locations using object identification techniques.

It is another object of the invention to provide a system and method that utilizes video clips for environment/location recognition.

Other objects and advantages of the invention will become apparent as the description proceeds.

SUMMARY OF THE INVENTION

In one aspect the invention relates to a method for identifying an environment and/or a location, comprising: a) receiving at least one video stream the frames of which contain images of an environment, details of an environment or of a location; b) extracting from said video stream a plurality of sequential frames, but not necessarily including all the frames in a sequence; c) generating a database associating a location or environment identification to each of said frames, said database containing identifying data related to one or more details contained in images of each of said frames; and d) comparing one or more detail of an image the location or environment of which it is desired to identify, with details of images contained in said database, to locate a location with matching details and thereby identifying their location or environment.

In an embodiment of the invention, the method comprises: a) receiving at least one video as an input and breaking said video into frames; b) automatically identifying the environment and/or location in each frame and associating each of said frames and each of the objects in said frame, to a location from a private image recognition database; c) if said location does not exist in said private image recognition database, identifying said location according to the audio of the video frame; d) if the location is not identified, using a public API database to identify said location and manually approving said identification and after such approval, adding said identified location to said private image recognition database; and e) identifying environment and/or location in a frame according to said associations of frames to environment and/or locations, and associations of objects in said frames to locations.

In an embodiment of the invention, the method further comprises the steps of: a) after identifying the location in a frame and associating said frame and objects to said location, filling gaps and removing uncertainties identifications of locations in frames; and b) adding to the operational database the new identified frames metadata and the association of said frames to a location.

In an embodiment of the invention, the video stream is acquired using a crawler.

In an embodiment of the invention, the comparison with details of images contained in said database is to locate one or more images with matching details and thereby identifying the location or environment.

In an embodiment of the invention, a method for planning a trip using the method of the invention, comprises the following steps:

a. presenting videos with identified location or environment that are relevant to a requested destination along with additional data on said identified environments/locations;
b. allowing the user to choose attractions he want to visit by viewing the videos;
c. outputting a trip plan recommendation according to said video location and to said user selection.

In an embodiment of the invention, the additional data comprises text, photos, audio, maps reviews, descriptions and ratings.

In another aspect the invention relates to a system for identifying an environment and/or a location, comprising:

a) circuitry adapted to receive at least one video stream the frames of which contain images of an environment, details of an environment or of a location;
b) a video parsing element adapted to extract from said video stream a plurality of sequential frames, not necessarily including all the frames in a sequence;
c) a database suitable to associate a location or environment identification to each of said frames, said database containing identifying data related to one or more details contained in images of each of said frames; and
d) comparing elements adapted to compare one or more detail of an image the location or environment of which it is desired to identify, with details of images contained in said database, to locate a location with matching details and thereby identifying their location or environment.

BRIEF DESCRIPTION OF THE DRAWINGS

FIGS. 3A-3E schematically shows the user interface of a verification application according to an embodiment of the invention;

DETAILED DESCRIPTION OF THE EMBODIMENTS OF THE INVENTION

Figure 1:
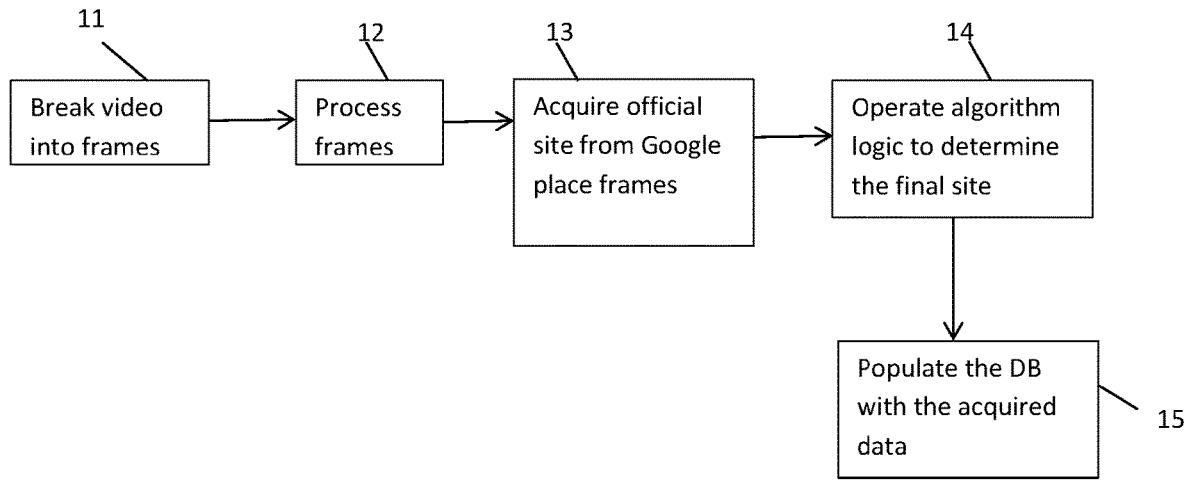
FIG. 1 schematically describe the method of the invention.

The system and method of the present invention identify an environment or a location out of a sequence of information received in a video format. The invention provides a learning system and therefore the more videos that are received, relating to a specific environment/location, the more accurate the identification will be when a different image is later analyzed, including the ability to identify the environment/location seen from different viewpoint and angles. The system of the present invention employs a Deep Learning algorithm. Deep learning algorithms are known to the skilled person and, therefore, are not discussed in detail herein, for the sake of brevity. The invention permits to identify the location appearing in an image, even if the image does not exist in the system database and even if the frame was taken at a unique angle which doesn't exist in the system database. The system and method of the invention identify objects which are related to a specific environment/location and recognize the environment in which the object is located, even if the environment is not shown with the object related to it. Furthermore, the system of the invention also identifies the environment/location shown in a frame even if the object related to it is not shown. For example: the Eiffel Tower can be identified even if the analyzed image only shows the garden near the Eiffel Tower without showing the Tower itself.

The method of the invention comprises two stages:
A. A training stage, which is the stage of the construction of the image recognition database of the system, with the information of the frame location and the objects that are associated and/or tagged to said locations. The image recognition database can always be updated, even after the system is running.
B. An identification stage, which recognizes the environment/location of an image presented to the system, on the basis of the information found in the image recognition database. As the system of the invention is a learning system, the identification stage can always be updated with new locations and new frames that are added to the system as part of the training stage.

Prior art systems focus on analyzing an image to recognize objects found therein. In contrast, the invention assigns context to the objects in an image by using a plurality of images taken from a video stream. Thus, for instance, when a video camera sweeps a location and shows objects in the frames it creates from different points of view, the invention uses a plurality of images from the video to create context for the objects. Taking the simple example of the Eiffel Tower, when a frame in a video is seen showing a garden, after the previous or later frames showed the Eiffel Tower, context is generated for the garden that associates it with the Eiffel Tower, even though the Tower itself is never seen in the image of the garden. Accordingly, in an embodiment of the invention, the system comprises a location identification engine, which receives videos as an input, processes the videos and identifies and tags the locations in a plurality of frames of the videos. The engine uses sophisticated Vision processing technics along with public reverse image search API's and private image search DB. The private image search DB can be for instant a deep learning neural network.

FIG. 1 schematically illustrates the method of the invention, which in one embodiment comprises the following steps:
1. The first step 11, is to receive a video as an input and to break said video into single frames. In case of a 360 degree video, (A 360 degree video is a video where for each frame, several images image are taken, each image in a different angle. For example: a 360 degree video of a room is taken from the middle of the room, while every second four pictures are taken simultaneously, one at each wall direction. When the video is played, it allows the user to "look" through the four images at every frame by connecting the images into a "rounding" frame) each frame which is constructed from a few images in different angles, is divided to its rounding frames and images.
2. In the second step 12, of the frame processing, each frame is sent to the Image recognition Database (DB) for identification. In the present invention the deep learning technique is used in order to train the image recognition DB with images of sites that includes both images of the site itself and also images of the site surroundings. This allows the system of the invention eventually to identify the environment of a site even if it does not appear in the image. As part of the deep learning technique the site category is broken into sub-categories so that, for example, for the Eiffel Tower—there is a sub category that includes images of the Tower itself and another sub-category of images of a tree near the Tower. Since the private image recognition DB is trained using images from both categories, it can now identify the Tower itself as the Eiffel Tower and the tree next to him as relating to the Eiffel Tower too.

In case of 360 degree video, all the "rounding" frames are sent for identification. The private image recognition DB returns identification for the frame, if the site in the image is identified according to the thresholds predefined in the image recognition DB. If the site/location in the frame is not identified, the image recognition DB returns a "not identified" response. The identification processes is done for all the frames of the inputted video.

If the frame was matched by the image recognition DB, then the identification process for said frame is done. In case of a search which is a part of a full video tag the next step is to continue to the next frame. If the search was triggered by a user request, the system returns a response including the location identification, or using the identification to provide the location-based output that the user requested. If identification from the visual information of the private recognition database only failed, an attempt is made to identify the site/location name using the video's audio stream. At first a transcript is created for the audio around the frame (e.g., 10 seconds before and 10 seconds after). Then, each word from the resulting transcript is sent to a suitable API (google places for example) to try and locate a site based on the words used in the video. If the API returns a site/location, such site/location is set to be the frame site and the information is saved in a video result list. If the above steps fail, the image can be searched in a public reverse image search engine (for instance, using the Google Vision API or the Google image search). The public API will typically return a guess for the frame's location. i.e. steps 12 of processing the frames and step 13 of acquiring official site from google place frames are done for all the frames in the video, and step 14 is carried out.

After step 12, the system of the invention holds a list of the video frames, where for each frame there is either an official site ID arrived at from the private image DB, or a location/site guess from a public reverse image API, or from the audio transcript, or no match at all (from any search). The next (optional) step 13, is carried out for location that were recognize by the public search engine or using the sound of the video. In this step an official site recognition from Google place frames is acquired. For frames that were identified from the public API (guesses), a request is sent to Google places API to try and identify the site officially. Once this is done, the system of the invention holds a list of frames with official identification or frames with no match.

3. In step 14 (also optional), completions and correction algorithms are operated on the list of frames with site/location identification:
   a. a completion algorithm to complete the identified frames. The completion algorithm comprises the following steps:
      i. Run on all frames;
      ii. If a frame is not identified and the previous frame is identified, get the previous frame site X-1;
      iii. Run through the next frames (up to some threshold Z, for example: Z=5) and search for another identified frame the site of which appears to be identical to X;
      iv. If found, set the unidentified frame site to X;
      v. Using the threshold parameter Z it can be determined how large are the holes that are filled (a hole size is the number of the unidentified frames between two identified frames).
   b. an alternative technique for frames identification completion which is based on the video scenes can also be used. By analyzing the scenes in the video, it can be determined if some frames were taken in the same place as the frame next to it.
   c. a different algorithm is operated to fix frames with wrong identification as follows:
      i. Run on all frames;
      ii. If a frame identification is different than the previous frame identification, get the previous frame site X-1;
      iii. Run through the next frames (up to some threshold Y, for example: Y=5) and search for another identified frame, the site of which is identical to X;
      iv. If found, set the frame with wrong identification to X;
      v. Using the threshold parameter Y, it can be determined how large are the sequences with wrong identification that are fixed.

4. Finally, in step 15 the resulting data are injected into (a rational SQL DB which is) a private database.
   a. If a site/location or city does not exist in the DB it is created automatically.
   b. All the video data (source, id, length . . . ) and tagged sites/locations are injected to the private DB.

As stated above, the present invention location identification engine uses Deep Learning technics. In an embodiment of the invention the system uses the Convolutional Neural Networks algorithm. This algorithm is a variant of deep learning algorithms, which mimics the way animals and humans process visual elements and categorize objects. The method of the present invention uses Convolutional Neural Networks to categorize the different images to their location/site id's. As part of the CNN (convolutional neural network) sub-categories are used, in order to be able to identify a single site from different angles. As already stated above, since such algorithms are known to the man of the art, they are not explained herein in detail, for the sake of brevity.

In an embodiment of the invention, the present invention location identification engine uses a Revers Image Search DB technology. Reverse image search DB permits to index photos with identifiers (every photo has a key/ID identifying it) in the database and later on, sends a request with one photo and the DB will match the given photo to the photos already indexed in the database, using various image pattern matching algorithms. Eventually the result set is a list of "Hits", every hit including the hit photo identifier and a score implying how much the indexed photo matches the one given in the request.

In one embodiment of the invention, when indexing a photo, the photo itself is not saved in the DB. The photo is decoded in a binary way which allows later to match other photos to it.

Figure 2:
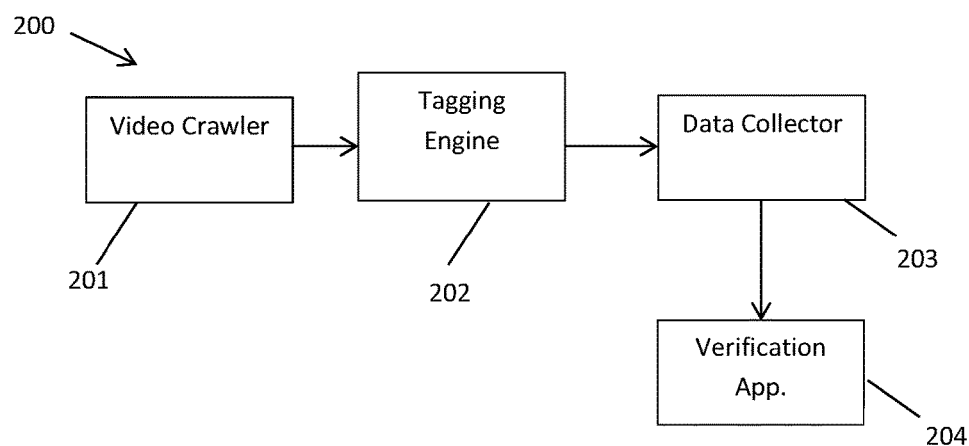
FIG. 2 schematically illustrate the steps by which videos are crawled and data relating thereto is collected.

FIG. 2 schematically shows system 200 which present the steps by which videos are crawled and data relating thereto is collected. A crawler 201 collects videos from the internet relating to a specific location. A tagging engine 202 (i.e. the image recognition database) receives the video collected from crawler 201, processes the videos and identifies the environment/location in every frame of each video. A data collector 203 receives the environments/locations identified in the videos and collects additional data on said environments/locations. A verification application 204, receives the video data, verifies and approves the tagged video data. Approval can be done automatically or manually, according to the specific requirement and desired accuracy of the operation.

The step of relevant video collection is performed by the web crawler 201. The crawler 201, connects to video sites such as YouTube (can be also Vimeo, Netflix, Yahoo screen or any other video web site) and conducts search queries on the videos in the site with pre-configured key words. The selected videos can be regular videos or 360-degree videos. For example, the crawler can be configured as follows:
   crawl on YouTube web site;
   look for videos whose title contains the word "Paris" and "attractions";
   filter the results set for videos with length larger than 10 minutes;
   filter out results which their title contains the words: slideshow and landing.

On the video list which is received from the above query, the crawler traverses each video in the list and also filters videos according to their transcription (most video sites include transcription for the video). Videos whose transcript contains desired key words (such as Paris or attractions) are collected. Videos whose transcript includes undesired key words (such as slideshow) are removed from the final results list.

After each query, the crawler 201 analyzes the results set. For videos which are selected as relevant videos a request is sent for similar videos and the system 200 process them as well.

The crawler runs according to a predefined schedule and sends different queries from time to time in order to get different results.

The resulting video list is pushed to a queue of "Videos require processing" and waits for the location identification engine 202 to pull and process them. The location identification engine 202 automatically processes, tags and identifies the location in each frame of the video list as described above. After a video is auto tagged, a data collector 203 pulls additional information from the web for new locations/sites (location that are first inserted to the information DB) that were created during the processing and tagging of this video, such as photos, reviews, description, rating etc.

The data collector 203 pulls the data from public API's such as Google places, Trip advisor, Lonely Planet and so on for each new site created by the location identification engine.

Once the auto-location identification engine 202 adds the tagged videos to the DB, the videos are still not usable by the product platforms that uses the system of the invention (a trip planner web site, for example). In order for it to be usable for such specific purpose it must be verified and approved by an administrator, by reviewing the auto tags assigned by the auto-location identification engine. This process is conducted using a verification application 204. The application 204 allows opening a previously tagged video and reviewing the tags assigned to it. Using the application, the administrator can edit the tags, create new sites, and update titles and descriptions and so on. Of course, this process can also be fully automated so as to avoid human intervention, although then in many cases the desired precision of identification may not be at the level desired by a user.

Once the administrator finishes the review he can use the application to mark the video as approved. From this point and on the video is available in every product platform and it is also added to the train process so the system can "learn" from the approved results.

Figure 3A:
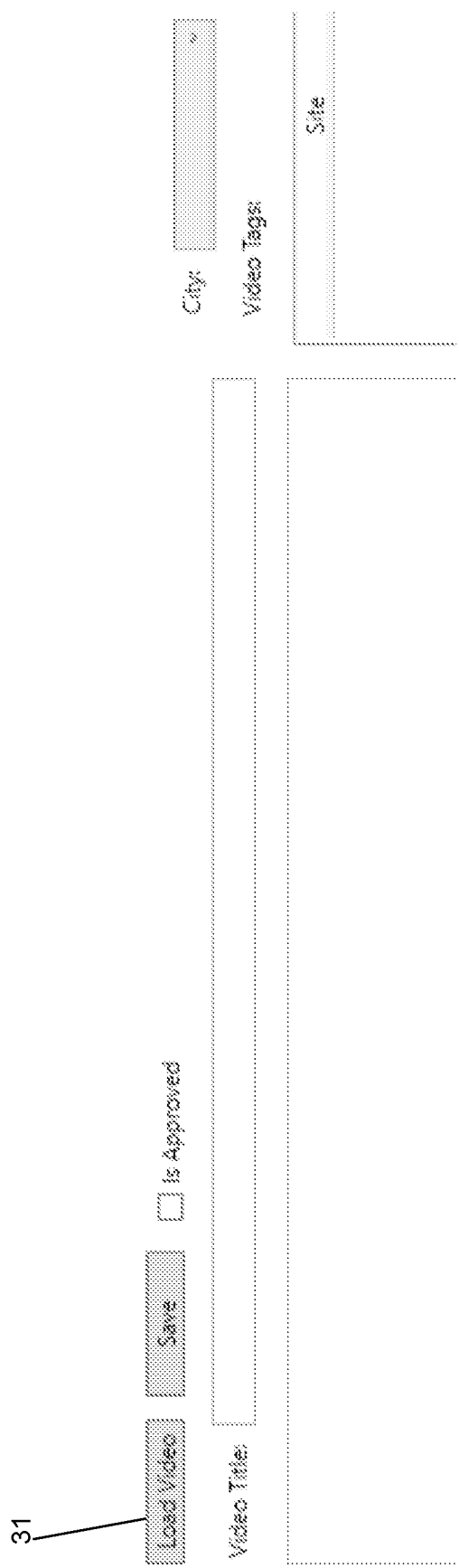
Figure 3C:
Figure 3E:
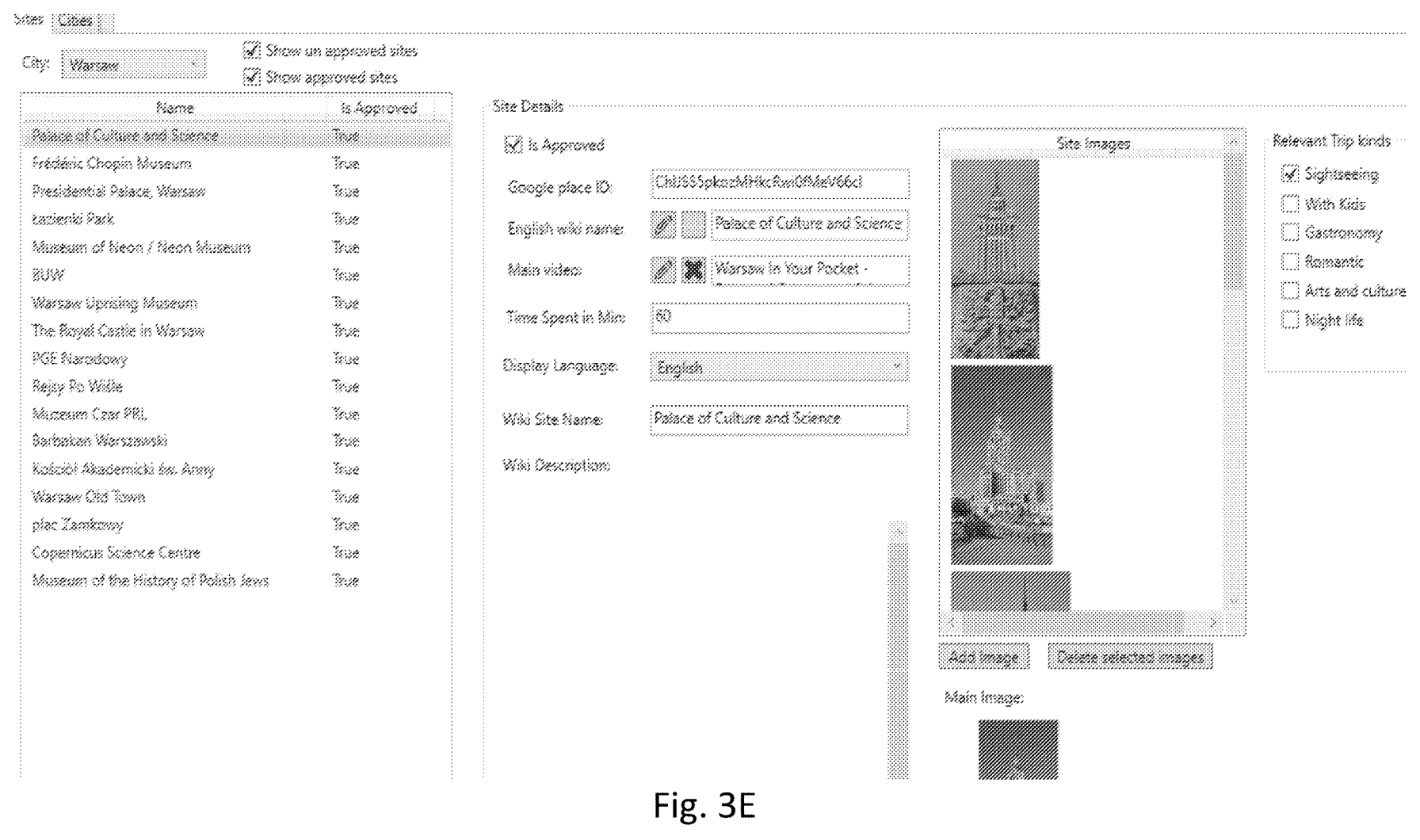

FIG. 3 (A through E) schematically shows the user interface of the tagging application 204, according to an embodiment of the invention. FIG. 3A schematically shows the login screen of the tagging application 104. Upon pressing the "load video" key 31, a list of videos that were input to the system automatically or manually is presented as shown in FIG. 3B. The selection of a specific video shows all the tags and associations that the system automatically tagged the video, and allows editing each location/site in the video as can be seen in FIG. 3C. FIG. 3D shows the list of locations and sites that have been automatically identified by the system. It is possible to add sites, edit them and approve every site as shown in FIG. 3D. FIG. 3E presents the additional information available for every site such as Wikipedia page, leading video, pictures, trip categorization, recommended duration of a trip in the location and more.

Upon approval of a video, its tagged frames are sent to the image search DB for training. From this point and on, when the location identification engine 202 searches for similar photos it can retrieve their exact site identification from the Image DB.

An example of the use of the system and method of the present invention is a trip planning system based on video. It is being understood that this is merely an example of a useful application and is not intended to limit the invention in many ways. As will be apparent to the skilled person, the location recognizing method and system of the invention can be used for a variety of different applications that require recognizing a location from an image.

The trip planning system allows creating a full trip from end to end in a one stop, including selecting attractions, hotels, flights, rental cars and booking it all. The trip planning system platform includes the following components:

Web application;
Mobile application;
Web Service;
Information DB; and
Search DB.

The web application according to one embodiment of the invention enables end users to build their trip plan end to end, using a web browser. The uniqueness of the trip planning system based on video analyzed according to the invention is in the way in which a user selects the attraction he wants to visit. In trip planners known in the art, the user searches for sites using text, and in order to decide whether he wants to visit the site or not he is required to read data. However in the trip planning system based on video according to the invention, the selection is made using videos. When the user enters the site, he watches videos of attractions, accommodation options, etc., and then he can decide according to what he sees, if he would like to visit the location/site or not. In one embodiment, after the user selects the sites he desires to visit, the trip planning engine calculates the best hotels, flights and rental cars for the user and provides the user a full trip plan for his convenience.

After a user creates a trip plan for himself using the web application, he can use a mobile app during his trip. The mobile application provides real time information on the locations/sites the user selected for his trip, trip directions, attraction information (opening hours, process, etc.), restaurants information and so on. The information is sent directly to the application once the user finishes planning the trip.

The planning trip system operational web service provides the needed data and infrastructure to the various apps. The system exposes a restful API (a Restful api is a type of api which works on top of http protocol) with all needed functionality.

The verification application provides the ability to manage the information DB which holds the trip planning service data (update sites, remove, edit text, etc.).

The illustrative system discussed with reference to FIG. 3 is built, in one example of execution, using the new Asp.Net Core 1.0 state of the art technology. It can also be built using any other web service technology, such as vertx or nodeJS.

All the data required for the trip planning system is held in an information DB based on rational technology. Currently, MS SQL DB on top of azure is used; however, any other rational DB can be used, such as mySql, LiteSql, Oracle etc. The information DB is populated using the auto-location identification engine and using data that arrives from the web site, such as users' data, ratings and so forth.

The trip planning system according to one embodiment of the invention uses in addition to the information DB which is a rational DB, a search DB that is based on document indexing technologies. The search DB allows fetching data according to key words quickly, and enables features such as search suggestions in the web site. The trip planning system uses, in one embodiment, a search DB called Solr, but can also use any other search DB such as Elastic search, Lucene or cloud search services. The search DB is accessed by the web site through the operational web service. The search DB is populated using data replication from the information DB according to a pre-defined schedule. According to an embodiment of the invention the entire trip planning system stack is deployed in cloud services, which allows the platform to scale up as much as needed.

The information database is hosted, in one embodiment, in Azure SQL DB, while the rest of the components are hosted in virtual machines in the cloud.

All the above description of preferred embodiments has been provided for the purpose of illustration only and is not intended to limit the invention in any way, except as per the appended claims.

The invention claimed is:

1. A method for planning a trip by identifying a location of an unidentified environment depicted in a video stream, comprising:
   a) receiving at least one video stream, said video stream including at least a first plurality of frames each including an image of an object of interest and an environment of surroundings of said object of interest that are identifiable with said object of interest;
   b) breaking said at least one video stream into disunited frames;
   c) sending each of said disunited frames to a location identification engine which is configured to identify a location that is visible in the sent frame, wherein said location identification engine is trained through deep learning techniques to compare images within each disunited frame with images stored in an image recognition database;
   d) for each of the first plurality of frames, identifying a location of the object of interest on a basis of the comparison performed with the location identification engine, and further identifying a location of the environment of the surroundings of the object of interest;
   e) if one or more of said disunited frames is unidentified by said location identification engine, invoking a completion algorithm to identify an environment that is visible in a given one of said unidentified frames, whereby said completion algorithm is operable to identify one or more frames within the first plurality of frames with an identified location and being associated with an identified environment, to determine that an environment shown in said unidentified frame is the same as the environment with the identified location, and to set a location of the given unidentified frame with the location of the environment with the identified location;
   f) presenting videos with the identified location that are relevant to a requested destination;
   g) allowing a user to choose attractions the user wants to visit by viewing the videos and selecting at least a portion thereof; and
   h) outputting a trip plan recommendation according to the videos provided with the identified location and according to user selections during the allowing step, wherein said trip plan recommendation includes a list of sites to visit.

2. The method according to claim 1, wherein the frames broken from the at least one video stream are a plurality of sequential frames.

3. The method according to claim 2, wherein the plurality of sequential frames broken from the at least one video stream include all the frames in a sequence.

4. The method according to claim 1, further comprising the step of identifying a location that is visible in the sent frame, if not identified by the location identification engine, according to keywords derived from an audio transcript of the sent frame.

5. The method according to claim 4, further comprising the steps of:
   i) using a public API database to identify a location that is visible in the sent frame, if not identified according to an audio of the sent frame;
   ii) manually approving said identification;
   iii) adding the identified location using the public API database to the image recognition database after such approval; and
   iv) invoking the completion algorithm if a location that is visible in the sent frame is not identified using the public API database.

6. The method according to claim 5, further comprising the step of adding metadata of each of the disunited frames associated with the identified location to the image recognition database.

7. The method according to claim 1, wherein the video stream is acquired using a crawler.

8. The method according to claim 7, wherein additional data acquired by the crawler is related to one or more of the groups consisting of text, photos, audio, maps reviews, descriptions and ratings.

9. The method according to claim 1, wherein the received at least one video stream is a 360-degree video whereby images of an object are taken at different angles and are connected into a panoramic rounding frame, and the rounding frames of the 360-degree video are sent to the image recognition database.

10. The method according to claim 1, further comprising, following setting of the location of each of the unidentified disunited frames, adding each of the unidentified disunited frames whose location has been set and accompanying metadata to the image recognition database.

* * * * *